(12) United States Patent
Maya et al.

(10) Patent No.: US 11,710,066 B2
(45) Date of Patent: Jul. 25, 2023

(54) TIME-SERIES FEATURE EXTRACTION APPARATUS, TIME-SERIES FEATURE EXTRACTION METHOD AND RECORDING MEDIUM

(71) Applicant: KABUSHIKI KAISHA TOSHIBA, Minato-ku (JP)

(72) Inventors: Shigeru Maya, Yokohama (JP); Tatsuya Inagi, Kawasaki (JP); Akihiro Yamaguchi, Kita (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 788 days.

(21) Appl. No.: 16/563,266

(22) Filed: Sep. 6, 2019

(65) Prior Publication Data

US 2020/0143283 A1 May 7, 2020

(30) Foreign Application Priority Data

Nov. 1, 2018 (JP) ................................ 2018-206777

(51) Int. Cl.
*G06Q 40/00* (2023.01)
*G06N 20/00* (2019.01)
*G06N 5/02* (2023.01)

(52) U.S. Cl.
CPC ............... *G06N 20/00* (2019.01); *G06N 5/02* (2013.01)

(58) Field of Classification Search
CPC .................. G06N 20/00; G06N 5/02
See application file for complete search history.

(56) References Cited

U.S. PATENT DOCUMENTS 10,235,993 B1 * 3/2019 Bradley .................. G10L 17/08
2004/0085323 A1 * 5/2004 Divakaran ............ G06F 16/739
345/581

(Continued)

FOREIGN PATENT DOCUMENTS

CN 104462217 * 3/2015 ............. G06F 17/30
EP 0223014 * 9/1986

(Continued)

OTHER PUBLICATIONS

Guijo-Rubio et al. ."Time series clustering based on the characterisation of segment typologies," arXiv:1810.11624v1, 2018 (Year: 2018).*

(Continued)

*Primary Examiner* — Abhishek Vyas
*Assistant Examiner* — William B. Bunker
(74) *Attorney, Agent, or Firm* — Oblon, McClelland, Maier & Neustadt, L.L.P.

(57) ABSTRACT

A time-series feature extraction apparatus has a coefficient outputter to output a coefficient to be used in calculation for classifying time series data into a plurality of segments, a segment position outputter to perform calculation for classifying the time series data into the plurality of segments based on the coefficient to output information on boundary positions of the plurality of segments, a cluster classifier to classify the plurality of segments into a certain number of plurality of clusters equal to or smaller than a certain number of the plurality of segments, a representative element outputter to output a representative element which represents a local feature of each of the plurality of clusters and is set for each of the plurality of segments, a feature degree calculator to calculate a feature degree of the representative element, and a representative element updater to update the representative element based on the feature degree.

20 Claims, 11 Drawing Sheets

(56) References Cited

U.S. PATENT DOCUMENTS

| | | | | |
|---|---|---|---|---|
| 2009/0222259 A1* | 9/2009 | Kida | ................ | G10L 15/02 |
| | | | | 704/207 |
| 2017/0124581 A1* | 5/2017 | Wilson | ................ | G06Q 30/02 |
| 2017/0147930 A1* | 5/2017 | Bellala | ................ | G06N 5/04 |
| 2018/0150547 A1* | 5/2018 | Pallath | ................ | G06N 20/00 |
| 2019/0034497 A1* | 1/2019 | Song | ................ | G06F 16/2477 |

FOREIGN PATENT DOCUMENTS

| | | | | |
|---|---|---|---|---|
| IN | 2019/23034688 | * | 3/2021 | |
| JP | 2013/175108 | * | 9/2013 | ............ G05B 23/02 |
| JP | 2015-103018 A | | 6/2015 | |
| JP | 2017-174234 A | | 9/2017 | |
| WO | WO-2014036173 A1 * | | 3/2014 | ......... A61B 5/02055 |
| WO | WO-2016122591 A1 * | | 8/2016 | ............ G06N 20/00 |
| WO | WO-2017034512 A1 * | | 3/2017 | |
| WO | WO-2018140337 A1 * | | 8/2018 | ........... G05B 23/024 |

OTHER PUBLICATIONS

Nanda Kishor M. Pai, "Building sharp regression models with k-Means Clustering + SVR," https://blog.paperspace.com, 2021 (Year: 2021).*

Diti Modi, "Diving into k-means," Towards Data Science, 2018 (Year: 2018).*

Montero et al., TSclust: An R package for time series clustering, Journal of Statistical Software, vol. 62, Issue 1, Nov. 2014 (Year: 2014).*

Denyse, "Time series clustering—deriving trends and archetypes from sequential data—Using machine learning to automate time series clustering process," Towards Data Science, 2021 (Year: 2021).*

Anonymous, "Time Series Cluster Validation: using cluster.stats metrics to decide optimal cluster number," Stack Over Flow https://tackoverflow.com 2016 (Year: 2016).*

* cited by examiner

| SensorA | sensorA RECORDED DATE AND TIME |
|---|---|
| 1.2 | 4/5 12:35 |
| 2.3 | 4/5 12:42 |
| 3.2 | 4/5 12:51 |
| 2.4 | 4/5 12:56 |
| 5.3 | 4/5 13:02 |
| 4.5 | 4/5 13:09 |
| 4.6 | 4/5 13:12 |
| 4.3 | 4/5 13:16 |
| 5.2 | 4/5 13:21 |
| 4.7 | 4/5 13:27 |
| 3.4 | 4/5 13:34 |

| SensorB | sensorB RECORDED DATE AND TIME |
|---|---|
| 3.4 | 4/5 12:32 |
| 2.5 | 4/5 12:46 |
| 4.6 | 4/5 12:53 |
| 1.3 | 4/5 12:59 |
| 3.5 | 4/5 13:05 |
| 7.4 | 4/5 13:11 |
| 2.6 | 4/5 13:18 |
| 2.3 | 4/5 13:28 |
| 1.5 | 4/5 13:32 |
| 2.7 | 4/5 13:26 |

FIG. 2

| SensorA | SensorB | RECORDED DATE AND TIME |
|---|---|---|
| 1.3 | 3.3 | 4/5 12:35 |
| 1.7 | 2.7 | 4/5 12:40 |
| 2.6 | 2.6 | 4/5 12:45 |
| 2.4 | 4.1 | 4/5 12:50 |
| 2.3 | 1.8 | 4/5 12:55 |
| 4.7 | 2.1 | 4/5 13:00 |
| 4.6 | 3.6 | 4/5 13:05 |
| 4.2 | 7.3 | 4/5 13:10 |
| 4.1 | 2.7 | 4/5 13:15 |
| 4.9 | 2.4 | 4/5 13:20 |

FIG. 3

| CLUSTER | REPRESENTATIVE ELEMENT DEGREE |
|---------|-------------------------------|
| CLUSTER A | 3.5 |
| CLUSTER B | 6.7 |

FIG. 6

WITHOUT SEGMENT-POSITION ADJUSTER

WITH SEGMENT POSITION- ADJUSTER

TIME-SERIES FEATURE EXTRACTION APPARATUS, TIME-SERIES FEATURE EXTRACTION METHOD AND RECORDING MEDIUM

CROSS REFERENCE TO RELATED APPLICATIONS

This application is based upon and claims the benefit of priority from the prior Japanese Patent Application No. 2018-206777, filed on Nov. 1, 2018, the entire contents of which are incorporated herein by reference.

FIELD

Embodiments of the present disclosure relate to a time-series feature extraction apparatus, a time-series feature extraction method and a recording medium.

BACKGROUND

Since various data can be obtained with advancement of IoT, an environment in which the conditions of various infrastructure equipment, production apparatuses, etc. can be captured in real time has been gradually developed. Since obtainable data include various kinds of data, the process of extracting a feature value of each data is often required as preprocessing.

However, it is difficult to extract the feature value in the case where there is no knowledge of each data and the characteristics of each data are not known. There are two methods, as follows, for dealing with such a case.

If data to be obtained is time series data, the first method is to divide the time series data into segments. According to this method, a global feature of the data can be extracted using correlation analysis, regression, etc. The second method is to extract a local feature of the time series data by picking up distinctive partial data of the time series data.

In the case of time series data, it largely depends on time and situation which of the global feature and local feature is better to extract, and hence, it is required to determine an appropriate method of preprocessing for each time series data. Moreover, when data carries a noise, both of the global and local features may not be correctly extracted.

There is a method, which has been proposed, to divide time series data into clusters with some sort of technique and to extract partial data that is a local feature, for each cluster. However, when the clusters include similar data, extracted partial data are also similar to one another, resulting in that the local feature cannot be correctly extracted.

BRIEF DESCRIPTION OF THE DRAWINGS

FIG. 2 is a figure showing one example of time series data output from a target data outputter;

FIG. 3 is a figure showing one example of time series data obtained after the time series data of FIG. 2 are aligned by a data aligner;

FIG. 6 is a figure showing one example of visualization of a representative element degree;

DETAILED DESCRIPTION

According to one embodiment, a time-series feature extraction apparatus has:

a coefficient outputter to output a coefficient to be used in classifying time series data into a plurality of segments;

a segment position outputter to classify the time series data into the plurality of segments based on the coefficient to output information on boundary positions of the plurality of segments;

a cluster classifier to classify the plurality of segments into a certain number of plurality of clusters equal to or smaller than a certain number of the plurality of segments;

a representative element outputter to output a representative element which represents a local feature of each of the plurality of clusters and is set for each of the plurality of segments;

a feature degree calculator to calculate a feature degree of the representative element; and a representative element updater to update the representative element based on the feature degree.

Hereinafter, embodiments of the present disclosure will now be explained with reference to the accompanying drawings. In the following embodiments, a unique configuration and operation of a time-series feature extraction apparatus will be mainly explained. However, the time-series feature extraction apparatus may have other configurations and operations omitted in the following explanation.

First Embodiment

Figure 1:
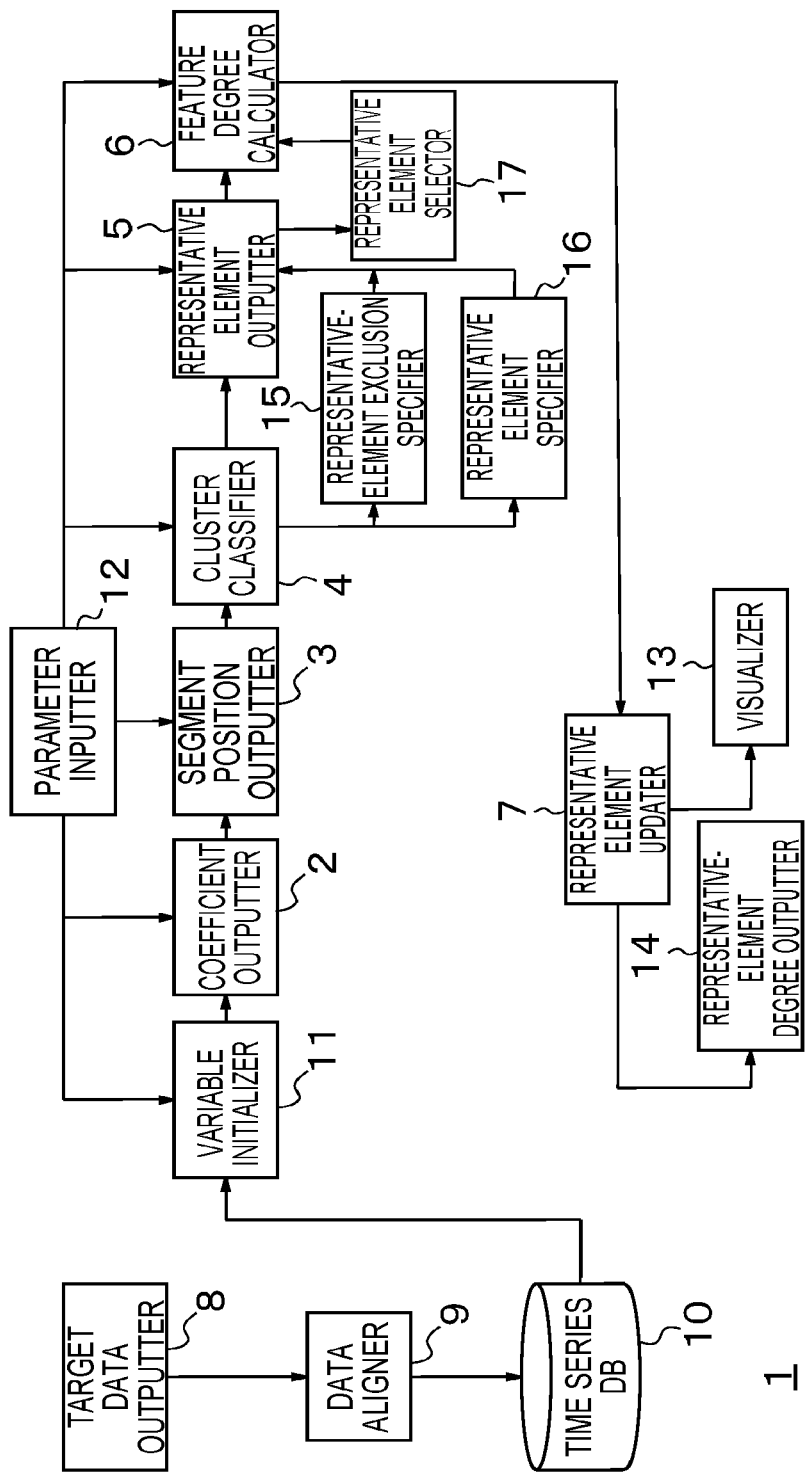
FIG. 1 is a schematic block diagram showing the configuration of a time-series feature extraction apparatus according to a first embodiment.

FIG. 1 is a schematic block diagram showing the configuration of a time-series feature extraction apparatus 1 according to a first embodiment. The time-series feature extraction apparatus 1 of FIG. 1 has a feature capable of correctly extracting a global feature and a local feature of time series data. To the time-series feature extraction apparatus 1 of FIG. 1, one or plural kinds of time series data are input. Accordingly, the time-series feature extraction apparatus 1 of FIG. 1 is capable of accepting the input of multivariate time-series data composed of plural kinds of time series data.

The time-series feature extraction apparatus 1 of FIG. 1 is provided with a coefficient outputter 2, a segment position outputter 3, a cluster classifier 4, a representative element outputter 5, a feature degree calculator 6, and a representative element updater 7.

The coefficient outputter 2 outputs a coefficient to be used in calculation for classifying time series data into a plurality of segments. For example, when classifying the time series data into a plurality of segments using a regression model, the coefficient outputter 2 outputs a regression coefficient of the regression model.

The time series data to be input to the coefficient outputter 2 are output from a target data outputter 8 such as infrastructure equipment, a variety of production apparatuses, plants, etc. The target data outputter 8 may output plural kinds of time series data. The time series data output from the target data outputter 8 may be aligned in the order of time stamps by a data aligner 9. The time series data aligned by the data aligner 9 may be stored once in a time series database (time series DB, hereinafter) 10, and then the time series data output from the time series DB 10 may be input to the coefficient outputter 2 at a desired timing.

FIG. 2 is a figure showing one example of time series data output from the target data outputter 8. FIG. 2 shows an example in which time series data are output from a sensor A and a sensor B. Each time series data has sensor data and recorded date and time, as a pair. The sensor data may be univariate data or multivariate data. The data output from the target data outputter 8 may be data for which preprocessing has been applied. The preprocessing may, for example, be a process of normalizing each time series data into 0 s and 1 s, a whitening process implemented with correlation between time series data in the case of multivariate data, a process of specifying the maximum or minimum value each sensor data can take, a frequency conversion process for each time series data, etc. In the time series DB 10, sensor data per product, time series data at a predetermined time interval, etc. may be stored. FIG. 3 is a figure showing one example of time series data obtained after the time series data of FIG. 2 are aligned by the data aligner 9.

At the former stage side of the coefficient outputter 2, a variable initializer 11 may be provided, as shown in FIG. 1. The variable initializer 11 initializes various kinds of variables to be used in classifying time series data into a plurality of segments. When classifying the time series data into a plurality of segments using a regression model, the variable initializer 11 initializes various kinds of variables to be used in the regression model. The variable initializer 11 may perform initialization on segment positions, cluster allocation, etc. The initialization on cluster allocation may, for example, be performed based on k-means, mixed regularization distribution, etc. The initialization on segment positions may be performed to set the segments at a regular interval.

The coefficient output from the coefficient outputter 2 of FIG. 1 is input to the segment position outputter 3. The segment position outputter 3 classifies the time series data into a plurality of segments based on the coefficient output from the coefficient outputter 2, to output information on boundary positions between the plurality of segments. For example, with the regression model using the regression coefficient output from the coefficient outputter 2, the segment position outputter 3 performs fitting to the time series data. The regression model is provided for each of a plurality of clusters. Then, the segment position outputter 3 outputs boundary positions between the plurality of segments based on a regression model with which the most appropriate fitting result can be obtained.

The cluster classifier 4 classifies the plurality of segments into a plural number of clusters equal to or smaller than the number of the plurality of segments. By the cluster classifier 4, each segment is assigned to any of the clusters. The details of segments and clusters will be described later.

The representative element outputter 5 outputs a representative element that expresses a local feature of each of the plurality of clusters and is set for each of the plurality of segments. The representative element is an indicator that expresses a local feature of each segment. The representative element outputter 5 may output a predetermined number of representative elements for each of the plurality of clusters.

The feature degree calculator 6 calculates a feature degree of representative elements. The feature degree is expressed, for example, with the difference between the representative elements. The feature degree calculator 6 may calculate the feature degree based on a similarity degree with time series data in a segment in which a representative element is present and a dissimilarity degree from time series data in a segment in which no representative element is present.

The representative element updater 7 updates the representative elements based on the feature degree calculated by the feature degree calculator 6. The representative element updater 7 updates each representative element so that the difference between the representative elements of the segments becomes as large as possible. A larger difference between the representative elements indicates that the local feature is more noticeable.

The time-series feature extraction apparatus 1 of FIG. 1 may be provided with a parameter inputter 12. The parameter inputter 12 inputs various variables (parameters), which are required for creating a model for classifying the time series data into a plurality of segments, to the components of the time-series feature extraction apparatus 1.

The time-series feature extraction apparatus 1 of FIG. 1 may be provided with a visualizer 13. The visualizer 13 visualizes time series data input to the coefficient outputter 2 and a plurality of representative elements corresponding to a plurality of clusters, respectively, output from the representative element outputter 5. The visualizer 13 may visualize time series data before being input to the coefficient outputter 2 and after subjected to noise component removal, and a plurality of representative elements corresponding to a plurality of clusters, respectively, output from the representative element outputter 5. Visualization may, for example, be performed in such a manner that the input time series data, segment positions, and cluster allocation can be visually perceived on a screen of a display apparatus not shown. Examples of visualization will be described later.

The time-series feature extraction apparatus 1 of FIG. 1 may be provided with a representative-element degree outputter 14. The representative-element degree outputter 14 outputs a representative element degree obtained by converting a representative element into a numerical value. Examples of the representative element degree will also be described later.

The time-series feature extraction apparatus 1 of FIG. 1 may be provided with a representative-element exclusion specifier 15. The representative-element exclusion specifier 15 specifies partial data to be excluded by the representative element outputter 5 from a representative element, in a plurality of clusters. In this case, the representative element outputter 5 generates a representative element from time-series data except for the partial data specified by the representative-element exclusion specifier 15, for each of the plurality of clusters.

The time-series feature extraction apparatus 1 of FIG. 1 may be provided with a representative element specifier 16. The representative element specifier 16 specifies partial data to be included by the representative element outputter 5 in a representative element, in a plurality of clusters. In this case, the representative element outputter 5 generates a representative element including the partial data specified by the representative element specifier 16, for each of the plurality of clusters. For the representative element specifier 16 and the representative-element exclusion specifier 15, a user may specify any part of a waveform that represents time series data, with a mouse or the like on a GUI window for visualization.

The time-series feature extraction apparatus 1 of FIG. 1 may be provided with a representative element selector 17. The representative element selector 17 selects remaining representative elements after excluding unnecessary representative elements from among the representative elements output from the representative element outputter 5. In this case, the feature degree calculator 6 calculates the feature degree of the representative elements selected by the representative element selector 17.

Figure 4:
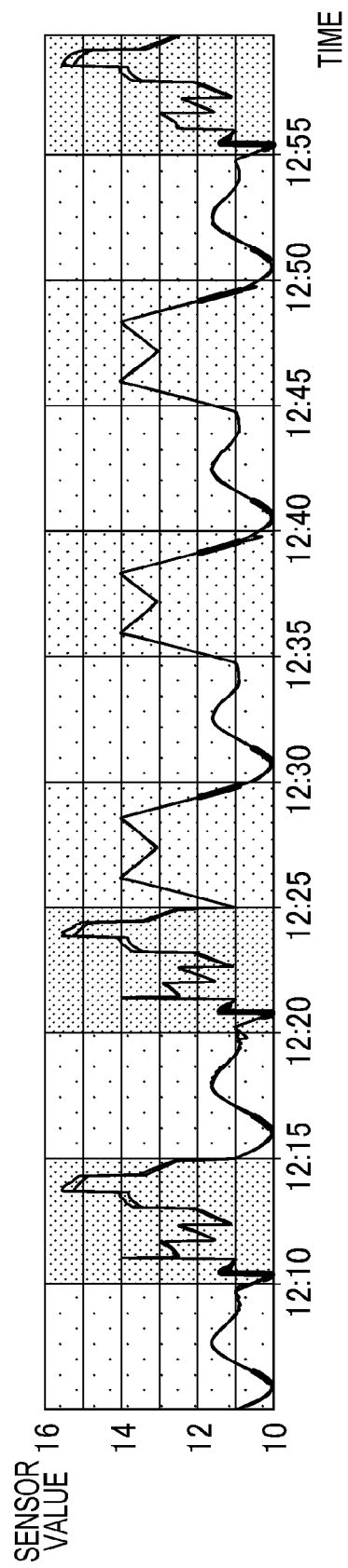
FIG. 4 is a figure showing one example of visualization by a visualizer.

FIG. 4 is a figure showing one example of visualization by the visualizer 13. In FIG. 4, the abscissa is time and the ordinate is a sensor value of sensor data. FIG. 4 shows an example in which time series data is classified into eleven segments and then each segment is assigned to any of three clusters. In FIG. 4, the three clusters are distinguished from one another with different hatching. In the example of FIG. 4, each segment is provided with one representative element in accordance with each cluster. Each representative element is indicated with a thick line. As shown in FIG. 4, the number of clusters is equal to or smaller than the number of segments. The representative element is determined for each cluster. Representative elements in a plurality of segments belonging to the identical clusters have the identical waveform. The representative element is partial data having a distinctive waveform in time series data of each segment.

Figure 5:
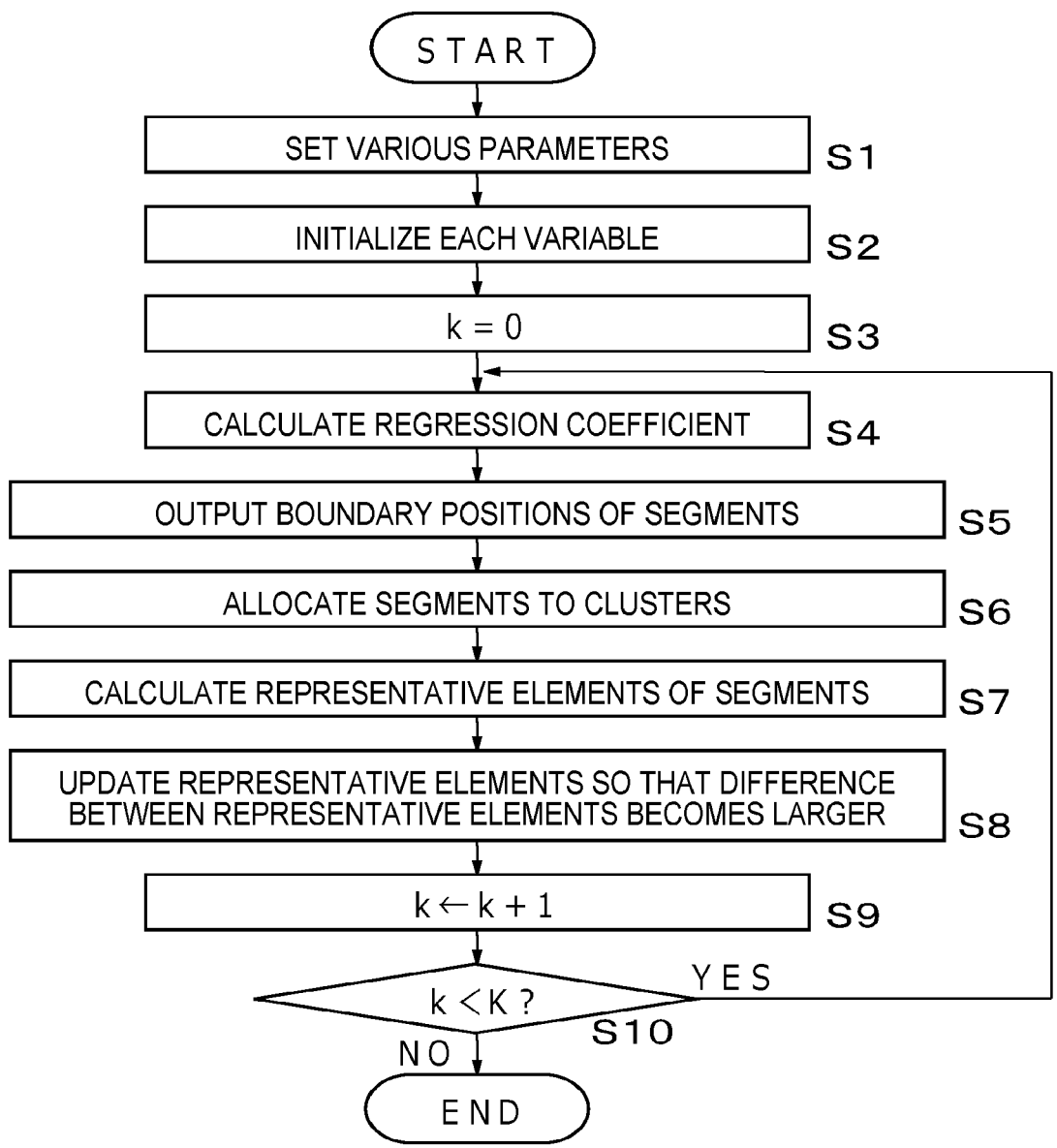
FIG. 5 is a flowchart showing a process performed by the time-series feature extraction apparatus according to the first embodiment.

FIG. 5 is a flowchart showing a process performed by the time-series feature extraction apparatus 1 according to the first embodiment. The time-series feature extraction apparatus 1 of FIG. 1 repeatedly performs the process of the flowchart of FIG. 5. First of all, various parameters are set in the components of the time-series feature extraction apparatus 1 of FIG. 1, from the parameter inputter 12 (step S1).

Subsequently, the variable initializer 11 initializes each variable of a regression model for classifying time series data into a plurality of segments (step S2). Moreover, the variable initializer 11 initializes the number of repetition k of the flowchart of FIG. 5 to zero (step S3).

Subsequently, the coefficient outputter 2 calculates and outputs a regression coefficient for classifying time series data obtained from the time series DB 10 to a plurality of segments (step S4). In step S4, a regression coefficient of a regression model expressed, for example, by a linear regression equation shown in an equation (1), is output.

$$\|x_{(k)} - x_{(Vk)}\theta\|^2 \quad (1)$$

The equation (1) is a linear regression equation for regressing the value of the k-th time series data using time series data other than the k-th time series data.

Subsequently, using the regression model based on the regression coefficient, the segment position outputter 3 classifies the time series data into a plurality of segments and outputs boundary position information of each segment (step S5). The segment position outputter 3 outputs a segment boundary position that is most conformable in the case where regression is performed with the regression model based on the regression coefficient output from the coefficient outputter 2.

The following equation (2) expresses a fitting error using linear regression in dividing the k-th time series x(k) of data having time stamps, the number of the time stamps being T, by a position u into two.

$$\|x_{(k)}^{(1:u)} - x_{(Vk)}^{1:u)}\theta_A\|^2 + \|x_{(k)}^{(u+1:T)} - x_{(Vk)}^{(u+1:T)}\theta_B\|^2 \quad (2)$$

In the above-described step S5, a boundary position of each segment is calculated and output, so that, for example, the value of the equation (2) becomes minimum.

Subsequently, the cluster classifier 4 classifies the plurality of segments into a plural number of clusters equal to or smaller than the number of the plurality of segments (step S6). In more specifically, the cluster classifier 4 uses the data of each segment obtained by the segment position outputter 3 to perform cluster allocation of the segments, in accordance with a determination criterion of which regression coefficient gives a minimum error when regression is performed with the regression coefficient. The regression coefficient is provided for each cluster.

Subsequently, the representative element outputter 5 calculates and outputs a representative element that expresses a local feature of each of the plurality of clusters and is set for each segment (step S7). As for the representative element, for example, Shapelets may be used.

Subsequently, the feature degree calculator 6 calculates a difference (feature degree) between representative elements and updates the representative elements so that the difference becomes as large as possible (step S8). The feature degree calculator 6 calculates a difference between representative elements, for example, using an objective function indicated by the following equation (3).

$$\text{Mindis}(x1, y1) + \text{Mindis}(x2, y2) + |C - \text{mindis}(x1, y2)| + |C - \text{mindis}(x2, y1)| \quad (3)$$

In the equation (3), x1 and x2 are data of segments, respectively, y1 and y2 are representative elements of the segments, respectively, C is a large enough value, and mindis(A, B) is an error most conformable when two time series data A and B are shifted. In the equation (3), mindis (x1, y1) is a numeric value of the degree of conformity between time series data of a segment x1 and the representative element y1 that is part of the time series data of the segment x1, the smaller the better. In the same manner, mindis(x2, y2) is a numeric value of the degree of conformity between time series data of a segment x2 and the representative element y2 that is part of the time series data of the segment x2, the smaller the better. On the other hand, mindis(x1, y2) is a numeric value of the degree of conformity between the time series data of the segment x1 and the representative element y2 of the segment x2, the larger the better. Therefore, it is desirable for |C−mindis(x1, y2)| to be smaller as much as possible. Moreover, mindis(x2, y1) is a numeric value of the degree of conformity between the time series data of the segment x2 and the representative element y1 of the segment x1, the larger the better. Therefore, it is desirable for |C−mindis(x2, y1)| to be smaller as much as possible.

As described above, in step S8, the representative elements are updated so that addition of the terms in the equation (3) becomes as smaller as possible.

Subsequently, the variable k is incremented by 1 (step S9). It is then determined whether the number of repetition k is smaller than a threshold value K (step S10). If the number of repetition k is smaller than the threshold value K, step S4 and the following steps are repeated. The process of FIG. 5 ends when the number of repetition k becomes equal to the threshold value K.

In addition to perform the process of the flowchart of FIG. 5, the time-series feature extraction apparatus 1 may perform visualization to express each time series data in the form of a waveform as shown in FIG. 4 so that the segment boundary positions, cluster allocations, and representative elements can be visually perceived. Or, a representative element degree, which is obtained by converting a representative element into a numerical value based on, for example, the following equation (4), may be visualized.

$$\text{representative element} = \frac{\min i_{j \neq i} \min ds(x_j, y_i)}{\min ds(x_i y_i)} \quad (4)$$

The denominator in the equation (4) is a numeric value of the degree of conformity between time series data of a segment xi and a representative element yi in the segment xi. The numerator in the equation (4) is a numeric value of the degree of conformity between time series data of a segment xj and the representative element yi in the segment xi. Since, in the equation (4), it is desirable for the denominator to be smaller whereas it is desirable for the numerator to be larger, it is desirable for the representative element degree to be larger.

FIG. 6 is a figure showing one example of visualization of the representative element degree. Since the representative element is set for each cluster, in FIG. 6, the representative element degree is converted into a numerical value for each cluster. The example of FIG. 6 shows that the representative element is in better conformity in the cluster B than in the cluster A.

The coefficient outputter 2 in the time-series feature extraction apparatus 1 of FIG. 1 outputs, for example, a regression coefficient, however, may output a coefficient other than regression coefficient, such as, a correlation coefficient that is each component of a correlation matrix. As the correlation matrix, for example, a variance-covariance matrix S shown in an equation (5) may be used.

$$\log|\Sigma| + tr|\Sigma^{-1} S| \quad (5)$$

In the equation (5), $\Sigma$ is a variable in the case where time series data is assumed to follow the multivariate normal distribution, and S is a variance-covariance matrix among variables of time series data X. When performing correlation analysis using a correlation matrix, in step S4 of FIG. 5, the coefficient outputter 2 calculates and outputs a correlation coefficient for classifying time series data into a plurality of segments. In step S4 of FIG. 5, the segment position outputter 3 uses a correlation matrix based on the correlation coefficient to classify the time series data into the plurality of segments, to output boundary position information of the segments.

As described above, in the first embodiment, in order to capture a global feature of time series data, the time series data is classified into a plurality of segments, cluster allocation of the segments is performed, the boundary position of each segment is adjusted using a regression model or the like, and cluster allocation is updated. Moreover, in order to capture a local feature of the time series data, representative elements provided for respective clusters are set for respective segments, and then the representative elements are updated so that the difference between the representative elements becomes as large as possible. According to the above, both of the global and local features of the time series data can be captured. In the present embodiment, since the global and local features of each time series data can be captured for multivariate time series data composed of a plurality of time series data, great many kinds of time series data can be efficiently processed.

Second Embodiment

A second embodiment is to remove a noise of time series, as preprocessing.

Figure 7:
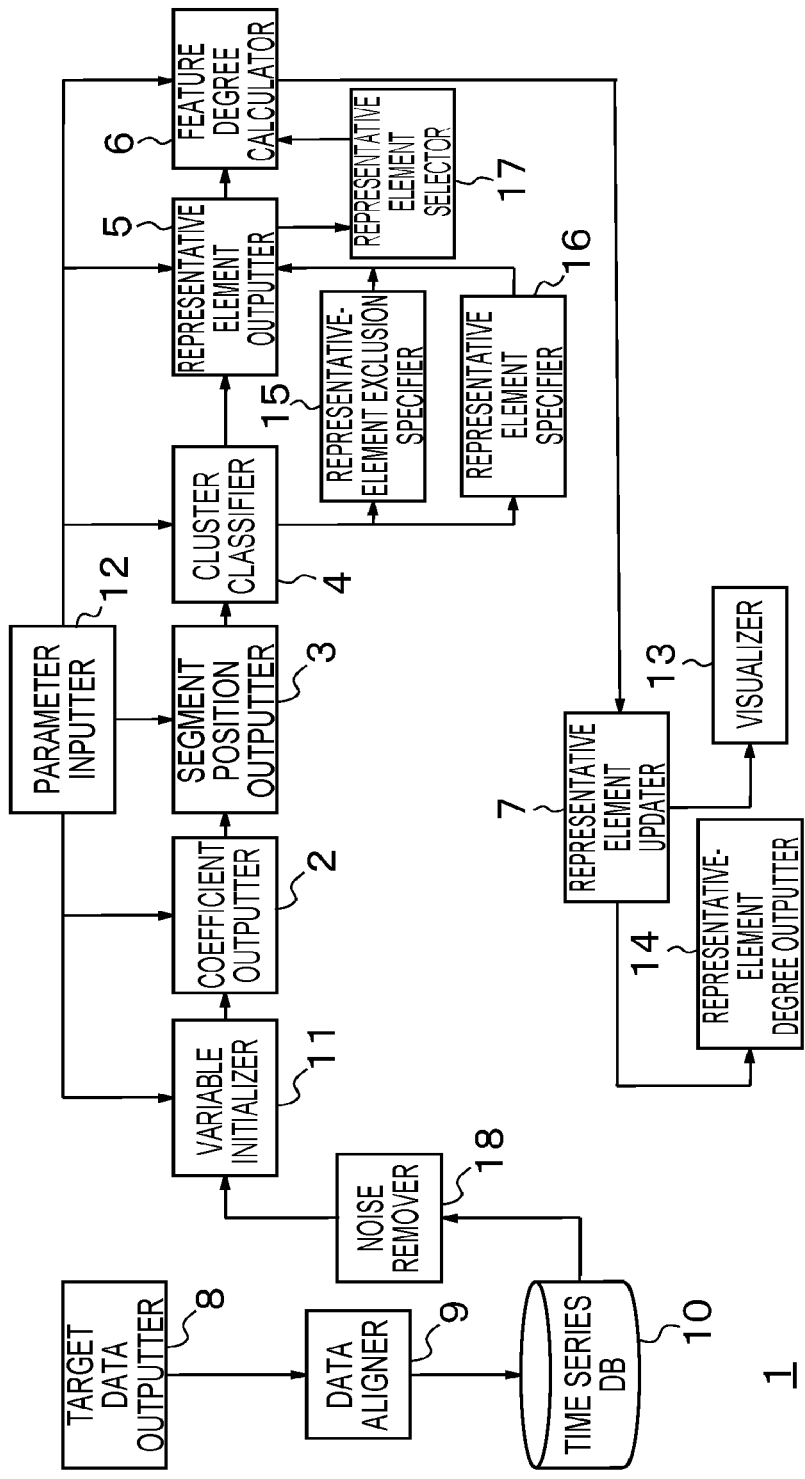
FIG. 7 is a block diagram schematically showing the configuration of a time-series feature extraction apparatus according to a second embodiment.

FIG. 7 is a block diagram schematically showing the configuration of a time-series feature extraction apparatus 1 according to the second embodiment. The time-series feature extraction apparatus 1 of FIG. 7 is provided with a noise remover 18, added to the configuration of the time-series feature extraction apparatus 1 of FIG. 1. The noise remover 18 is provided between the time series DB 10 and the variable initializer 11. The noise remover 18 performs noise removal from time series data read out from the time series DB 10. Although, the noise removing method does not matter, for example, principal component analysis (PCA) may be performed to extract a useful data component only. Or, a regularization term may be added to a regression equation or the like. A larger penalty is given by the regularization term as being more separated from a predetermined reference value. Or, noise-removed time series data may be obtained by regression from another time series data. The optimization method in this case may be ADMM (Alternating Direction Method of Multipliers) and the like. For example, by regression with the following equation (6), noise-removed time series data may be estimated.

$$\hat{x}_{(k)} = x_{(V k)} \theta \quad (6)$$

Figure 8:
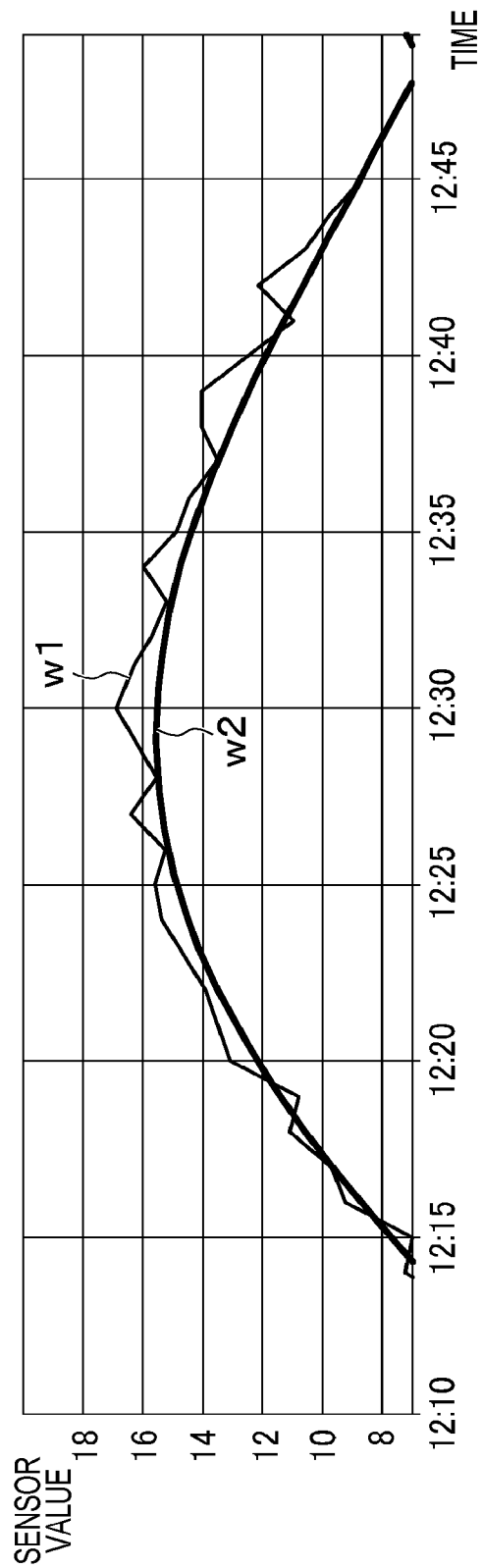
FIG. 8 is a figure showing waveforms of time series data obtained before and after a noise remover performs noise removal.

FIG. 8 is a figure showing waveforms of time series data obtained before and after the noise remover 18 performs noise removal from the time series data. In FIG. 8, a waveform w1 and a waveform w2 indicate time series data obtained before and after noise removal, respectively. As shown, by performing noise removal, the shape of waveform can be smoothed.

As described above, in the second embodiment, the noise remover 18 is provided to classify time series data into a plurality of segments to perform cluster allocation, after a noise included in the time series data is removed. Therefore, segmentation and cluster allocation are not affected by the noise.

Third Embodiment

When plural kinds of time series data are input, with a time lag, to the time-series feature extraction apparatus 1, it is not desirable to utilize segment boundary positions of one kind of time series data for segmentation of another kind of time series data, with no position adjustments. For example, when a sensor B starts detection five minutes after the detection staring time of a sensor A, it is desirable to adjust the time lag of five minutes for sensor data of the sensors A and B. Accordingly, a third embodiment is to perform segmentation and cluster allocation in view of the time lag between various kinds of time series data.

Figure 9:
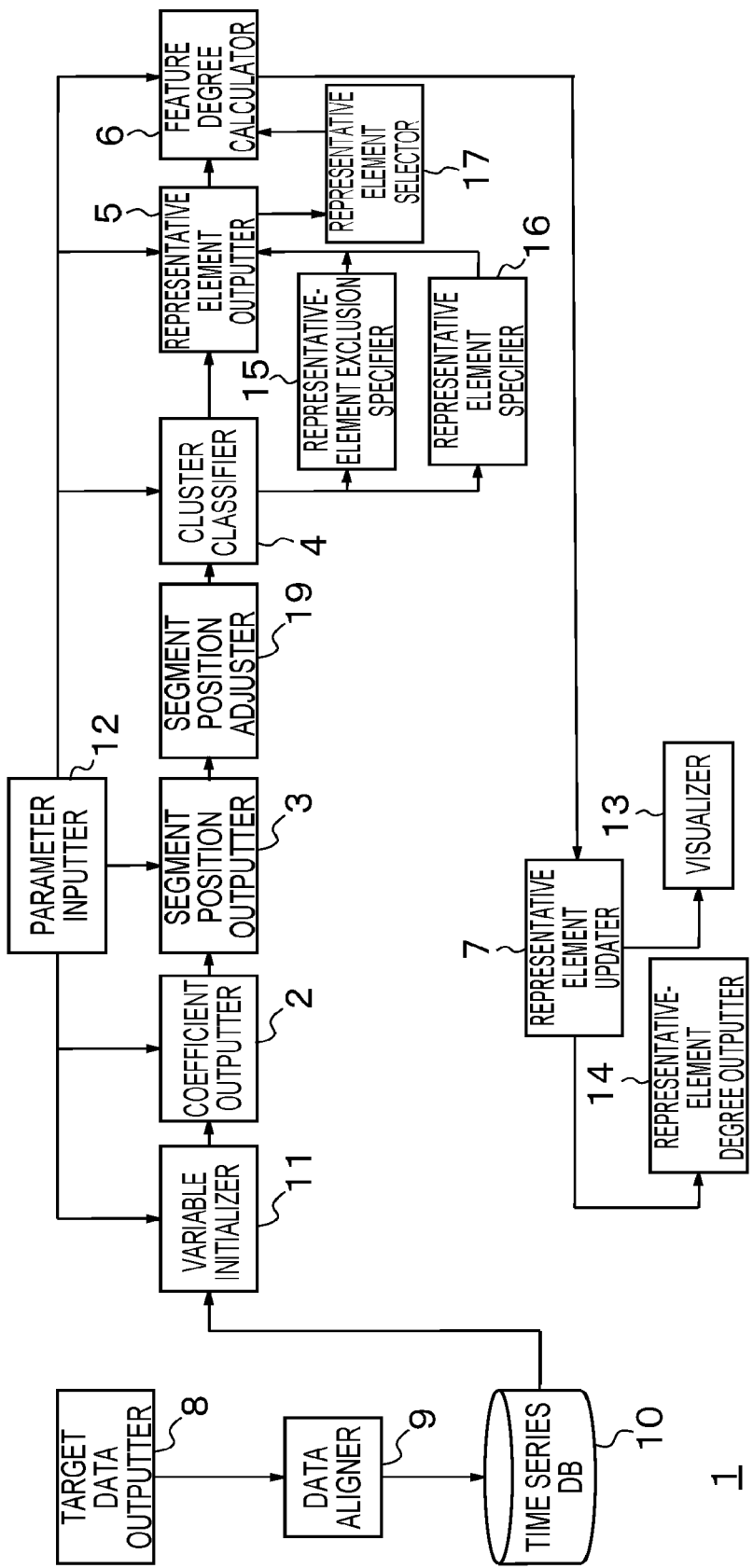
FIG. 9 is a block diagram schematically showing the configuration of a time-series feature extraction apparatus according to a third embodiment.

FIG. 9 is a block diagram schematically showing the configuration of a time-series feature extraction apparatus 1 according to the third embodiment. The time-series feature extraction apparatus 1 of FIG. 9 is provided with a segment position adjuster 19, added to the configuration of the time-series feature extraction apparatus 1 of FIG. 1. In accordance with the time lag between plural kinds of time series data to be input, the segment position adjuster 19 adjusts the boundary positions of a plurality of segments output from the segment position outputter 3. The cluster classifier 4 classifies a plurality of segments, for which the boundary positions have been adjusted by the segment position adjuster 19, into a plurality of clusters, for each of the plurality of time series data.

Figure 10A:
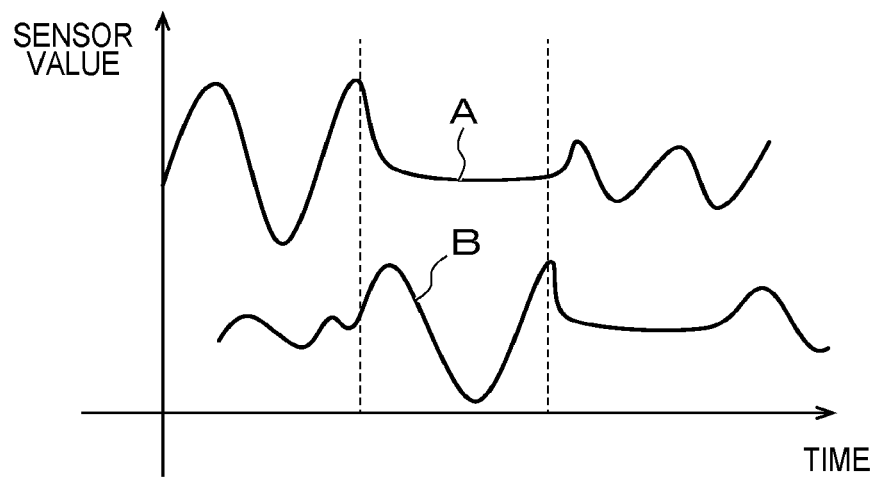
FIGS. 10A and 10B are figures schematically showing the operation of a segment position adjuster.
Figure 10B:
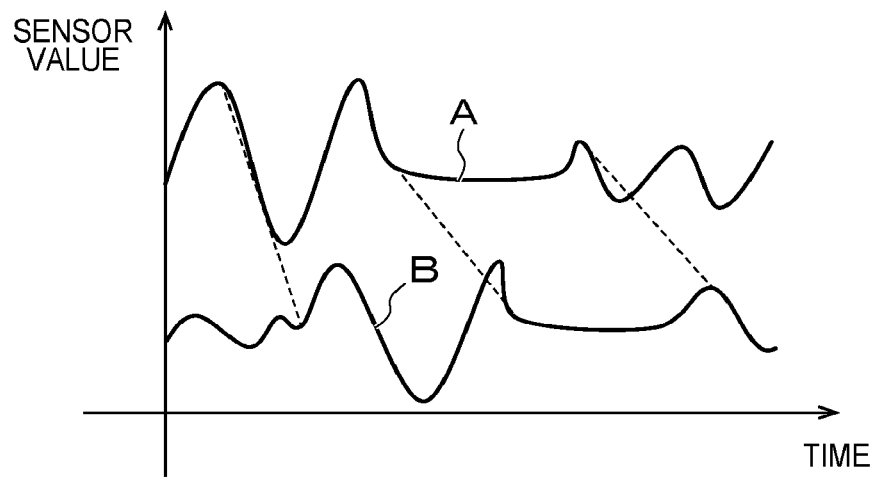

FIGS. 10A and 10B are figures schematically showing the operation of the segment position adjuster 19. When the sensor data of the sensors A and B are input, with a time lag, to the time-series feature extraction apparatus 1, the sensor data are classified into segments of completely different waveforms when segmentation is performed with the time lag as it is, as shown in FIG. 10A. Accordingly, as shown in FIG. 10B, the segment position adjuster 19 shifts in time the segment boundary positions of the sensor data of the sensor B from the segment boundary positions of the sensor data of the sensor A, so that both sensor data can be classified into segments of similar waveforms.

Figure 11:
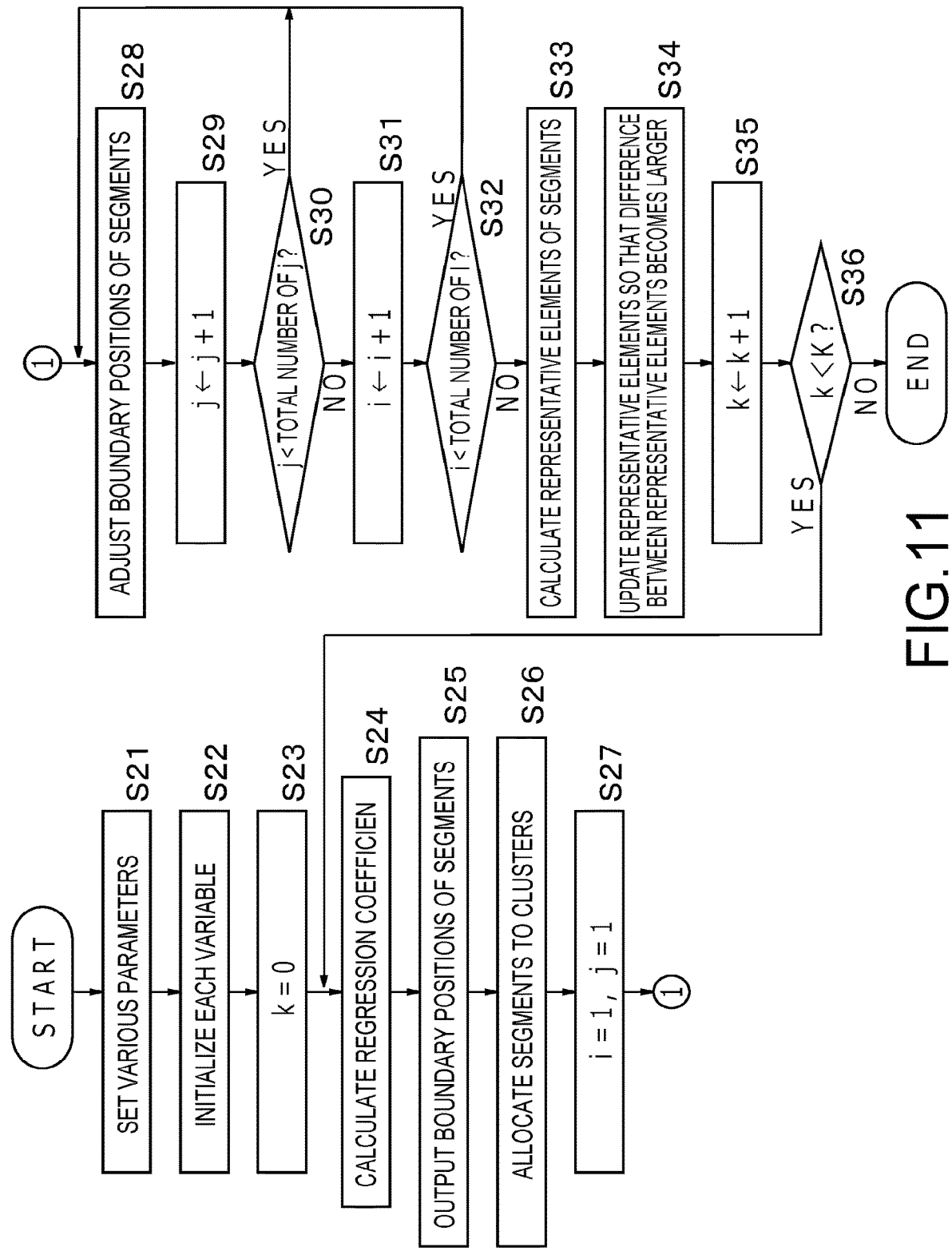
FIG. 11 is a flowchart showing a process performed by the time-series feature extraction apparatus of FIG. 9.

FIG. 11 is a flowchart showing a process performed by the time-series feature extraction apparatus 1 of FIG. 9. Steps S21 to S26 are identical to steps S1 to S6 of FIG. 5, respectively. In step S27, variables i and j for adjusting a time lag between different time series data are initialized to 1 (step S27).

Subsequently, the segment position adjuster 19 compares the i-th time series data and the j-th time series data to adjust the segment boundary positions of the i-th and j-th time series data so that both time series data are most conformable with each other (step S28). Then, the variable j is incremented by 1 (step S29). It is then determined whether the variable j is smaller than the total number of variables j (step S30). If the variable j has not exceeded the total number, step S28 is repeated. If it is determined in step 30 that the variable j is not smaller than the total number, the variable i is incremented by 1 (step S31). It is then determined whether the variable i is smaller than the total number of variables i (step S32). If the variable j has not exceeded the total number, step S28 and the following steps are repeated. If it is determined in step 32 that the variable i has exceeded the total number, the processes identical to steps S7 and S8 are performed (step S33, S34). Next, the number of repetition k is incremented by 1 (step S35), it is determined whether the number of repetition k has reached a threshold value K (step S36). Step S24 and the following steps are repeated until the number of repetition k has reached the threshold value K. If it is determined in step 32 that the variable i has reached the total number of variables i, the processes is completed.

As described above, in the third embodiment, since the segment position adjuster 19 is provided, even if plural kinds of time series data are input with time lags to the time-series feature extraction apparatus 1, representative element calculation and updating can be performed after the time lag of each time series data is adjusted. Accordingly, change in segmentation and cluster allocation due to the time lag of time series data input to the time-series feature extraction apparatus 1 can be prevented.

At least part of the time-series feature extraction apparatus 1 explained in the above-described embodiments may be configured with hardware or software. When it is configured with software, a program that performs at least part of the time-series feature extraction apparatus 1 may be stored in a storage medium such as a flexible disk and CD-ROM, and then installed in a computer to run thereon. The storage medium may not be limited to a detachable one such as a magnetic disk and an optical disk but may be a standalone type such as a hard disk and a memory.

Moreover, a program that achieves the function of at least part of the time-series feature extraction apparatus 1 may be distributed via a communication network a (including wireless communication) such as the Internet. The program may also be distributed via an online network such as the Internet or a wireless network, or stored in a storage medium and distributed under the condition that the program is encrypted, modulated or compressed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A time-series feature extraction apparatus for extracting global and local features from time series data, comprising:
processing circuitry in electronic communication via an electronic communication network with a first sensor and a second sensor, wherein the first and second sensors are each associated with infrastructure equipment or production apparatuses and each capture in real time a first time series data and a second time series data, the processing circuitry configured to, for each of the first and second time series data:
preprocess the time series data by normalizing each time series data;
output a coefficient of a regression model to be used in classifying time series data into a plurality of segments;
classify the time series data into the plurality of segments based on the coefficient to output information on boundary positions of the plurality of segments, wherein the regression model outputs boundary positions between the plurality of segments based on a most conformable fitting obtainable by the regression model;
classify the plurality of segments into a certain number of plurality of clusters equal to or smaller than a certain number of the plurality of segments, wherein allocation of the segments is determined by the coefficient that gives a minimum error;
output a representative element which expresses a local feature of each of the plurality of clusters and is set for each of the plurality of segments within each one of the plurality of clusters, wherein the representative element is selected following the exclusion from the waveform of unnecessary elements, wherein the selected representative element in a plurality of segments belonging to an identical cluster comprises partial data having an identical distinctive waveform;
for each cluster, calculate a feature degree of the representative element based on values of degrees of conformity in the waveform between the representative elements of the time series data for each of the plurality of segments in each cluster, wherein the feature degree comprises a numeric value which is as small as possible and which represents a similarity measure of the representative element within the segments of a cluster;
compare a first feature degree of a first cluster with a second feature degree of a second cluster and determine a difference, wherein the difference is as large as possible when compared to a threshold, wherein the difference represents a dissimilarity measure of the representative element of the first cluster versus the representative element of the second cluster, wherein a larger difference between the representative elements indicates that the local feature in each cluster is more noticeable;
if the threshold is not met, adjust a boundary position of the segments of the first cluster or the second cluster based on the difference between the feature degree of the representative elements of each cluster, wherein the boundary position of each segment is adjusted using a regression model;
update the representative element so that the feature degree becomes larger;
repeat the calculation of the feature degree of each cluster until the threshold of the difference is met; and
visualize the updated representative elements of each cluster in the time series data via an electronic display in communication with the processing circuitry, wherein the input time series data, segment positions, and cluster allocation can be visually perceived on a screen of the apparatus.

2. The time-series feature extraction apparatus of claim 1, wherein the processing circuitry is configured to output a predetermined number of representative elements for each of the plurality of clusters.

3. The time-series feature extraction apparatus of claim 1, wherein the processing circuitry is further configured to specify partial data to be excluded from the representative element, in the plurality of clusters, and
wherein the processing circuitry is configured to generate the representative element from the time-series data except for the specified partial data specified by the processing circuitry, for each of the plurality of clusters.

4. The time-series feature extraction apparatus of claim 1, wherein the processing circuitry is further configured to specify partial data to be included by the processing circuitry in the representative element, in the plurality of clusters, and
wherein the processing circuitry is configured to generate the representative element including the specified partial data specified by the processing circuitry, for each of the plurality of clusters.

5. The time-series feature extraction apparatus of claim 1, wherein the processing circuitry is configured to calculate the feature degree based on a similarity degree with time series data in a segment with the representative element present therein and a dissimilarity degree from time series data in a segment without the representative element present therein.

6. The time-series feature extraction apparatus of claim 1, wherein the processing circuitry is configured to adjust boundary positions of the plurality of segments output from the processing circuitry, in accordance with a time lag between plural kinds of time series data to be input, and
wherein the processing circuitry is configured to classify the plurality of segments having the boundary positions into the plurality of clusters, for each of the plural kinds of time series data.

7. The time-series feature extraction apparatus of claim 1, wherein the processing circuitry is further configured to remove a noise component included in the time series data, and
wherein the processing circuitry is configured to output the coefficient based on time series data having the removed noise component.

8. The time-series feature extraction apparatus of claim 7, wherein the processing circuitry is configured to remove the noise component included in the time series data by adding a regularization term to an equation to be used for classifying time series data into a plurality of segments.

9. The time-series feature extraction apparatus of claim 1, wherein the processing circuitry is configured to include a regression coefficient of a regression model to estimate time series data, and
wherein the processing circuitry is configured to perform fitting of time series data using the regression model corresponding to each of the plurality of clusters to output the information on the boundary positions of the plurality of segments.

10. The time-series feature extraction apparatus of claim 1, wherein the coefficient output from the processing circuitry includes a correlation coefficient of a correlation matrix to estimate time series data, and
wherein the processing circuitry is configured to perform fitting of time series data using the correlation matrix corresponding to each of the plurality of clusters to output the information on the boundary positions of the plurality of segments.

11. The time-series feature extraction apparatus of claim 1, wherein the processing circuitry is further configured to visualize time series data to be input to the processing circuitry and a plurality of representative elements to be output from the processing circuitry, the plurality of representative elements corresponding to each of the plurality of clusters.

12. The time-series feature extraction apparatus of claim 11, wherein the processing circuitry is configured to visualize time series data before being input to the processing circuitry and after having a noise component removed and a plurality of representative elements to be output from the processing circuitry, the plurality of representative elements corresponding to each of the plurality of clusters.

13. The time-series feature extraction apparatus of claim 1, wherein the processing circuitry is further configured to select remaining representative elements after excluding unnecessary representative elements from among the representative elements output from the processing circuitry, and
wherein the processing circuitry is configured to calculate feature degrees of the representative elements selected by the processing circuitry.

14. A time-series feature extraction method for extracting global and local features from time series data, the method being implemented by processing circuitry in electronic communication via an electronic communication network with a first sensor and a second sensor, wherein the first and second sensors are each associated with infrastructure equipment or production apparatuses and each capture in real time a first time series data and a second time series data, the method, for each of the first and second time series data, comprising:
preprocessing the time series data by normalizing each time series data;
outputting a coefficient of a regression model to be used in classifying time series data into a plurality of segments;
classifying the time series data into the plurality of segments based on the coefficient to output information on boundary positions of the plurality of segments, wherein the regression model outputs boundary positions between the plurality of segments based on a most conformable fitting obtainable by the regression model;

classifying the plurality of segments into a certain number of plurality of clusters equal to or smaller than a certain number of the plurality of segments, wherein allocation of the segments is determined by the coefficient that gives a minimum error;

outputting a representative element which expresses a local feature of each of the plurality of clusters and is set for each of the plurality of segments within each one of the plurality of clusters, wherein the representative element is selected following the exclusion from the waveform of unnecessary elements, wherein the selected representative element in a plurality of segments belonging to an identical cluster comprises partial data having an identical distinctive waveform;

for each cluster, calculating a feature degree of the representative element based on values of degrees of conformity in the waveform between the representative elements of the time series data for each of the plurality of segments in each cluster, wherein the feature degree comprises a numeric value which is as small as possible and which represents a similarity measure of the representative element within the segments of a cluster;

comparing a first feature degree of a first cluster with a second feature degree of a second cluster and determine a difference, wherein the difference is as large as possible when compared to a threshold, wherein the difference represents a dissimilarity measure of the representative element of the first cluster versus the representative element of the second cluster, wherein a larger difference between the representative elements indicates that the local feature in each cluster is more noticeable;

if the threshold is not met, adjusting a boundary position of the segments of the first cluster or the second cluster based on the difference between the feature degree of the representative elements of each cluster, wherein the boundary position of each segment is adjusted using a regression model;

updating the representative element based on so that the feature degree becomes larger;

repeating the calculation of the feature degree of each cluster until the threshold of the difference is met; and visualizing the updated representative elements of each cluster in the time series data via an electronic display in communication with the processing circuitry, wherein the input time series data, segment positions, and cluster allocation can be visually perceived on a screen of an apparatus.

15. The time-series feature extraction method of claim 14, further comprising:
outputting a predetermined number of representative elements for each of the plurality of clusters.

16. The time-series feature extraction method of claim 14, further comprising:
specifying partial data to be excluded from the representative element, in the plurality of clusters and
generating the representative element from the time-series data except for the specified partial data for each of the plurality of clusters.

17. The time-series feature extraction method of claim 14, further comprising:
specifying partial data to be included in the representative element, in the plurality of clusters; and
generating the representative element including the specified partial data for each of the plurality of clusters.

18. The time-series feature extraction method of claim 14, further comprising:
calculating the feature degree based on a similarity degree with time series data in a segment with the representative element present therein and a dissimilarity degree from time series data in a segment without the representative element present therein.

19. The time-series feature extraction method of claim 14, further comprising:
adjusting boundary positions of the plurality of segments in accordance with a time lag between plural kinds of time series data to be input; and
classifying the plurality of segments having the adjusted boundary positions into the plurality of clusters for each of the plural kinds of time series data.

20. A non-transitory computer-readable recording medium that stores a program for extracting global and local features from time series data, the program being executed by at least one processor in electronic communication via an electronic communication network with a first sensor and a second sensor, wherein the first and second sensors are each associated with infrastructure equipment or production apparatuses and each capture in real time a first time series data and a second time series data, the program causing the at least one processor to perform, for each of the first and second time series data, operations comprising:

preprocessing the time series data by normalizing each time series data;

outputting a coefficient of a regression model to be used in classifying time series data into a plurality of segments;

classifying the time series data into the plurality of segments based on the coefficient to output information on boundary positions of the plurality of segments, wherein the regression model outputs boundary positions between the plurality of segments based on a most conformable fitting obtainable by the regression model;

classifying the plurality of segments into a certain number of plurality of clusters equal to or smaller than a certain number of the plurality of segments, wherein allocation of the segments is determined by the coefficient that gives a minimum error;

outputting a representative element which expresses a local feature of each of the plurality of clusters and is set for each of the plurality of segments within each one of the plurality of clusters, wherein the representative element is selected following the exclusion from the waveform of unnecessary elements, wherein the selected representative element in a plurality of segments belonging to an identical cluster comprises partial data having an identical distinctive waveform;

for each cluster, calculating a feature degree of the representative element based on values of degrees of conformity in the waveform between the representative elements of the time series data for each of the plurality of segments in each cluster, wherein the feature degree comprises a numeric value which is as small as possible and which represents a similarity measure of the representative element within the segments of a cluster;

comparing a first feature degree of a first cluster with a second feature degree of a second cluster and determine a difference, wherein the difference is as large as possible when compared to a threshold, wherein the difference represents a dissimilarity measure of the representative element of the first cluster versus the representative element of the second cluster, wherein a larger difference between the representative elements indicates that the local feature in each cluster is more noticeable;

if the threshold is not met, adjusting a boundary position of the segments of the first cluster or the second cluster based on the difference between the feature degree of the representative elements of each cluster, wherein the boundary position of each segment is adjusted using a regression model;

updating the representative element based on so that the feature degree becomes larger;

repeating the calculation of the feature degree of each cluster until the threshold of the difference is met; and visualizing the updated representative elements of each cluster in the time series data via an electronic display in communication with the at least one processor, wherein the input time series data, segment positions, and cluster allocation can be visually perceived on a screen of an apparatus.

\* \* \* \* \*